US009450524B2

(12) United States Patent
Semura et al.

(10) Patent No.: US 9,450,524 B2
(45) Date of Patent: Sep. 20, 2016

(54) CONTROL APPARATUS FOR ROTATING MACHINE

(71) Applicants: DENSO CORPORATION, Kariya, Aichi-pref. (JP); Asmo Co., Ltd., Kosai, Shizuoka-pref. (JP)

(72) Inventors: Junichi Semura, Kariya (JP); Toshihiro Uchida, Nagoya (JP)

(73) Assignees: DENSO CORPORATION, Kariya, Aichi-pref. (JP); ASMO CO., LTD., Kosai, Shizuoka-pref. (JP)

( * ) Notice: Subject to any disclaimer, the term of this patent is extended or adjusted under 35 U.S.C. 154(b) by 0 days.

(21) Appl. No.: 14/739,112

(22) Filed: Jun. 15, 2015

(65) Prior Publication Data
US 2015/0365025 A1 Dec. 17, 2015

(30) Foreign Application Priority Data

Jun. 16, 2014 (JP) .................................. 2014-123114
Jan. 19, 2015 (JP) .................................. 2015-007533

(51) Int. Cl.
*H03K 5/00* (2006.01)
*H02P 6/10* (2006.01)
*H02P 29/00* (2016.01)

(52) U.S. Cl.
CPC ............. *H02P 6/10* (2013.01); *H02P 29/0038* (2013.01); *H02P 29/50* (2016.02)

(58) Field of Classification Search
CPC .... H02P 21/22; H02P 29/0038; H02P 29/50; H02P 6/10
See application file for complete search history.

(56) References Cited

U.S. PATENT DOCUMENTS

2014/0062375 A1*  3/2014  Suzuki .................... H02P 21/12
                                                                         318/496

FOREIGN PATENT DOCUMENTS

JP        2007-312520        11/2007

\* cited by examiner

*Primary Examiner* — Karen Masih
(74) *Attorney, Agent, or Firm* — Harness, Dickey & Pierce, P.L.C.

(57) ABSTRACT

A control apparatus, for a system including a rotating machine having a stator, around which a winding wire is wound, and a power conversion circuit, includes: a superimposition device that superimposes multiple harmonic currents, for converting a first electromagnetic force to a second electromagnetic force, on a fundamental wave current, the first electromagnetic force being a second or higher order electromagnetic force as a reduction object, the second electromagnetic force being a second or higher order electromagnetic force and different from the first electromagnetic force, an order of each harmonic current being between the first electromagnetic force and the second electromagnetic force; and a manipulation device that operates the power conversion circuit to flow the fundamental wave current, on which the harmonic currents are superimposed, in the winding wire.

12 Claims, 12 Drawing Sheets

NO SUPERIMPOSE CONTROL

11TH ORDER COMP SUPERIMPOSE

11TH/13TH ORDER COMP SUPERIMPOSE

CONTROL APPARATUS FOR ROTATING MACHINE

CROSS REFERENCE TO RELATED APPLICATIONS

This application is based on Japanese Patent Applications No. 2014-123114 filed on Jun. 16, 2014, and No. 2015-7533 filed on Jan. 19, 2015, the disclosures of which are incorporated herein by reference.

TECHNICAL FIELD

The present disclosure relates to a control apparatus applied to a system including a rotating machine having a stator, around which a winding wire is wound, and a power conversion circuit electrically connected to the rotating machine to apply a voltage to the winding wire.

BACKGROUND

As a control apparatus of this type, a control apparatus applied to a distributed-winding 3-phase synchronous motor to suppress fluctuations in a radial electromagnetic force acting on the stator forming the motor is known, as shown in Patent Literature 1 mentioned below. Specifically, in the control apparatus, harmonic currents of a "6M−1"-th or "6M+1"-th-order (M is a natural number) are superimposed on fundamental wave currents allowed to flow in winding wires in the individual phases. In this manner, a 6M-th-order electromagnetic force acting on the stator is suppressed to achieve a reduction in the noise of the motor.

When the "6M±1"-th-order harmonic currents are superimposed on the fundamental wave currents to reduce the 6M-th-order electromagnetic force, a "6M±2"-order electromagnetic force increases. When the fluctuating angular velocity of the increased electromagnetic force approaches the angular velocity corresponding to the resonant mode of the motor, the noise of the motor may increase.

To prevent such a problem, it can also be considered to, e.g., shape a magnetic flux distribution in the motor into a sinusoidal wave or provide a vibration control member in a vibration transmission portion which transmits the vibration of the motor. However, the method which shapes the magnetic flux distribution into a sinusoidal wave encounters a problem such that high-precision manufacturing control is required. On the other hand, the method which provides the vibration control member encounters a problem such that the number of components and manufacturing cost increase.

PRIOR ART LITERATURE

Patent Literature

Patent Literature 1: JP 2007-312520 A

SUMMARY

It is an object of the present disclosure to provide a control apparatus for a rotating machine which reduces a fluctuation in an electromagnetic force acting on the rotating machine to serve as a noise-causing factor.

According to an aspect of the present disclosure, a control apparatus controls a rotating machine in a system including the rotating machine having a stator, around which a winding wire is wound, and a power conversion circuit electrically connected to the rotating machine to apply a voltage to the winding wire. A fluctuating angular velocity of a fundamental wave current flowing in the winding wire is defined as a fundamental angular velocity. A current having a fluctuating angular velocity obtained by multiplying the fundamental angular velocity by an integer equal to or more than 2, which is defined as K, is defined as a K-th order harmonic current. An electromagnetic force acting on the rotating machine and having the fluctuating angular velocity obtained by multiplying the fundamental angular velocity by the integer is defined as a K-th order electromagnetic force. The control apparatus includes: a superimposition device that superimposes a plurality of harmonic currents, for converting a first electromagnetic force to a second electromagnetic force, on the fundamental wave current, the first electromagnetic force being a second or higher order electromagnetic force as a reduction object, the second electromagnetic force being a second or higher order electromagnetic force and different from the first electromagnetic force, an order of each harmonic current being disposed in a range between an order of the first electromagnetic force and an order of the second electromagnetic force; and a manipulation device that operates the power conversion circuit so as to flow the fundamental wave current, on which the plurality of harmonic currents are superimposed, in the winding wire.

In the above control apparatus, the fluctuating angular velocity of the first electromagnetic force is largely separated from the fluctuating angular velocity of the second electromagnetic force, compared with a case where the harmonic current is superimposed on the fundamental wave current in order to reduce the first electromagnetic force. Accordingly, the converted second electromagnetic force is separated largely from the angular velocity corresponding to a resonant mode of the rotating machine. As a result, the noise of the rotating machine is reduced.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

First Embodiment

Figure 1:
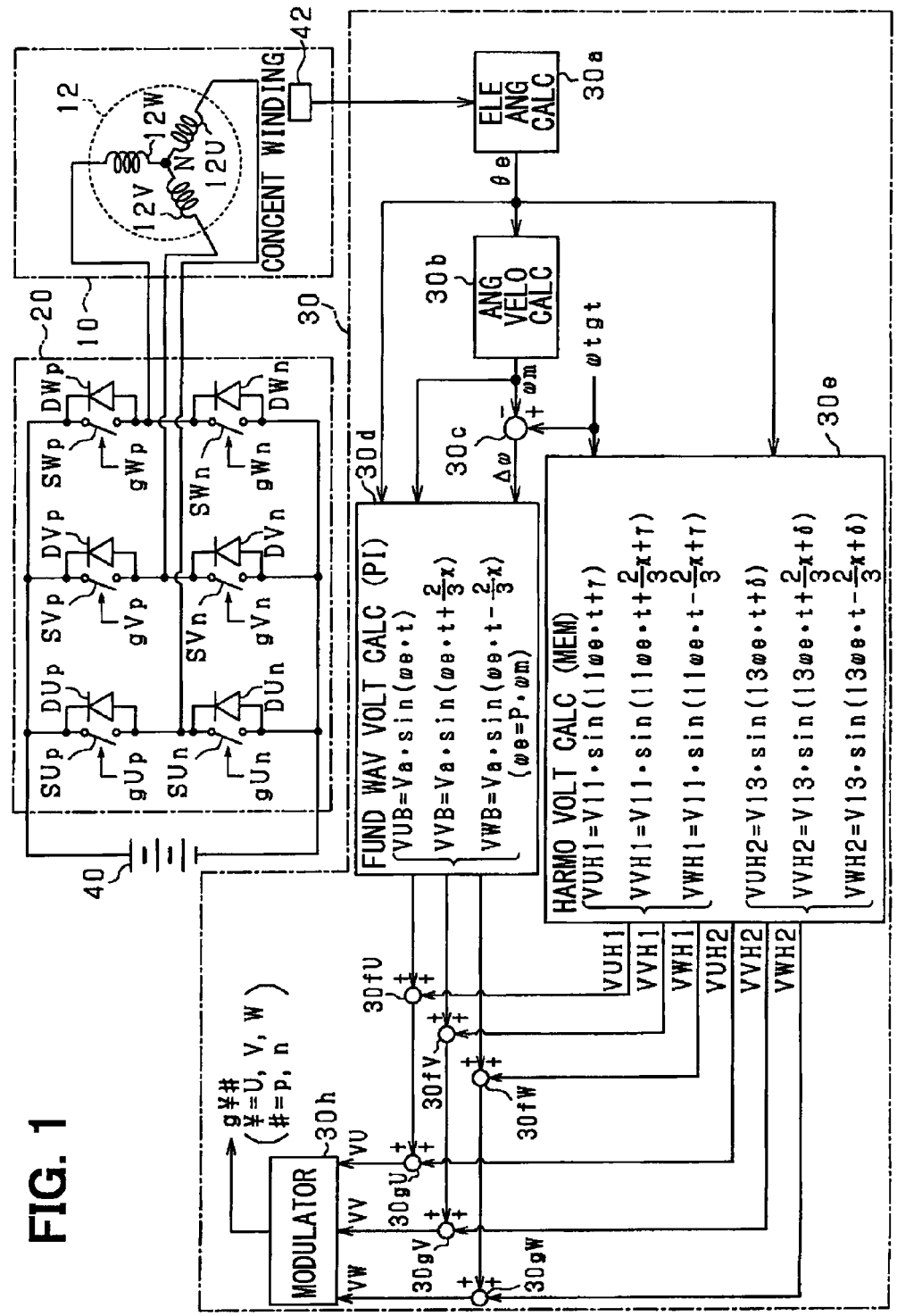
FIG. 1 is a diagram showing an overall configuration view of a motor control system according to a first embodiment.

Referring to the drawings, the following will describe a first embodiment in which a control apparatus according to the present disclosure is applied to a blower motor forming a vehicle-mounted air conditioner.

As shown in FIG. 1, a vehicle-mounted motor control system includes a motor 10, a 3-phase inverter 20 as a "power conversion circuit", and a control apparatus 30. The motor 10 is electrically connected to a battery 40 as a "dc power source" via the inverter 20.

The inverter 20 includes three pairs of upper arm switches S¥p (¥=U, V, or W) and lower arm switches S¥n which are connected in series. The respective connection points between the switches S¥p and S¥n are connected to the respective first terminals of ¥-phase stator winding wires 12¥ forming a stator 12 (stationary part) of the motor 10. The respective second terminals of the ¥-phase stator winding wires 12¥ are connected at a neutral point N to be star-connected. To the switches S¥#, free-wheel diodes D¥# are connected in inverse parallel. Examples of the above-mentioned switches S¥# (#=p or n) that can be used include voltage-controlled semiconductor switching elements (e.g., IGBTs or MOSFETs).

Figures 2, 3:
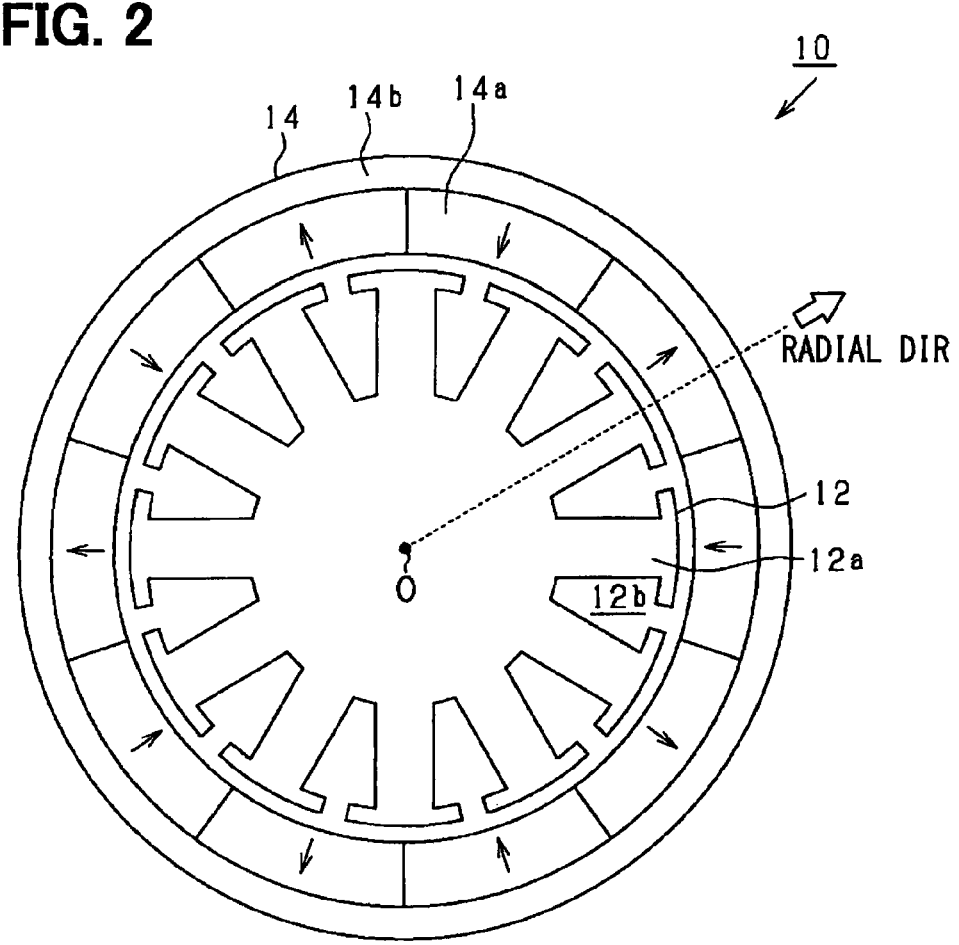
FIG. 2 is a diagram showing a cross-sectional view of a motor.
FIG. 3 is a diagram showing the resonant mode of a rotor.

The present embodiment uses, as the motor 10, a concentrated-winding permanent magnet synchronous machine. In particular, the present embodiment uses, as the motor 10, an outer-rotor motor, as shown in FIG. 2. Here, FIG. 2 shows a traverse sectional view in which the motor 10 has been cut along a plane orthogonal to the axis direction (rotation axis direction of the rotor 14) of the motor 10. Note that, through the center point O shown in FIG. 2, the rotation axis extends. In FIG. 2, hatching showing a cross section is omitted.

The motor 10 includes the stator 12, and an annular rotor 14 placed to be rotatable relative to the stator 12. The rotor 14 is placed outside the stator 12 in the radial direction of the rotor 14 and the stator 12 such that the rotor 14 and the stator 12 have a gap therebetween. The rotor 14 includes a plurality of (ten) permanent magnets 14a, and a back yoke 14b made of a soft magnetic body to connect the permanent magnets 14a. The individual permanent magnets 14a have identical shapes to form one magnetic pole. The permanent magnets 14a are magnetized in the radial direction of the rotor 14. The permanent magnets 14a adjacent in a circumferential direction have opposite polarities, i.e., S-poles and N-poles that are alternately arranged. Note that, in FIG. 2, the arrow portions of the arrow marks shown in the permanent magnets 14a show the N-poles.

The stator 12 includes twelve teeth 12a. As a result, the stator 12 is formed with twelve slots 12b. The twelve teeth 12a are arranged with an equal pitch in the circumferential direction of the stator 12 with the slots 12b interposed therebetween. That is, the present embodiment uses the motor 10 in which the number of pole pairs P is "5" and the number of slots S is "12".

Back to the description of FIG. 1, the control apparatus 30 is configured around a microcomputer as a main component and manipulates the inverter 20 to control a controlled variable (which is a rotational angular velocity in the present embodiment) of the motor 10 to a command (hereinafter referred to as a command angular velocity ωtgt). Specifically, to manipulate the upper/lower arm switches S¥p and S¥n included in the inverter 20, the control apparatus 30 generates upper/lower arm manipulation signals g¥p and g¥n and outputs the upper/lower arm manipulation signals g¥p and g¥n to the upper/lower arm switches S¥p and S¥n. Here, the upper arm manipulation signals g¥p and the corresponding lower arm manipulation signals g¥n are complementary to each other. That is, the upper arm switches S¥p and the lower arm switches S¥n connected in series to the upper arm switches S¥p are alternately brought into an ON state. Note that the command angular velocity ωtgt is output from, e.g., an external apparatus provided outside the control apparatus 30 in a vehicle and higher in order than the control apparatus 30.

To the control apparatus 30, a detection signal from a rotation angle sensor 42 (e.g., resolver) for detecting the positions of the magnetic poles of the rotor 14 is input.

Subsequently, a description will be given of drive control of the motor 10 which is performed by the control apparatus 30. An electric angle calculator 30a calculates the rotation angle (electric angle θe) of the motor 10 on the basis of the detection signal from the rotation angle sensor 42. The angular velocity calculation unit 30b calculates the rotational angular velocity ωm (mechanical angular velocity) of the motor 10 on the basis of the electric angle θe calculated by the electric angle calculator 30a. An error calculation unit 30c subtracts the rotational angular velocity ωm calculated by the angular velocity calculation unit 30b from the command angular velocity ωtgt to calculate a velocity error Δω.

A fundamental wave voltage calculation unit 30d (corresponding to "fundamental wave calculation device") calculates, as manipulated variables for feedback-controlling the rotational angular velocity ωm to the command angular velocity ωtgt, U-, V-, and W-phase fundamental wave voltages VUB, VVB, and VWB in a 3-phase fixed coordinate system represented by the following Equation (eq1) on the basis of the velocity error Δω, the electric angle θe, and the rotational angular velocity ωm. In the present embodiment, the fundamental wave voltage calculation unit 30d calculates the U-, V-, and W-phase fundamental wave voltages VUB, VVB, and VWB by proportional-integral control based on the velocity error Δω. More specifically, by the proportional-integral control mentioned above, each of the fundamental wave voltages VUB, VVB, and VWB over one period of the electric angle θe is calculated. Here, to calculate the fluctuating angular velocity of each of the fundamental wave voltages VUB, VVB, and VWB, an electric angular velocity ωe is used. The electric angular velocity ωe may be calculated appropriately as a value obtained by multiplying the input rotational angular velocity ωm by the pole pair number P. Then, each of the calculated fundamental wave voltages VUB, VVB, and VWB is output in correspondence to the input electric angle θe. The fundamental wave voltages VUB, VVB, and VWB have identically shaped waveforms in phases shifted from each other by "2π/3" as the electric angle θe.

Equation 1

$$VUB = Va \cdot \sin(\omega_e \cdot t)$$
$$VVB = Va \cdot \sin\left(\omega_e \cdot t + \frac{2}{3}\pi\right)$$
$$VWB = Va \cdot \sin\left(\omega_e \cdot t - \frac{2}{3}\pi\right)$$

(eq1)

Note that, by adjusting the phase differences between phase currents and phase voltages, the fundamental wave voltage calculation unit 30d may also perform ignition advancing control which improves the efficiency of the motor 10.

A harmonic voltage calculation unit 30e (corresponding to "harmonic calculation device") calculates, on the basis of the electric angle θe and the command angular velocity ωtgt, first U-, V-, and W-phase harmonic voltages VUH1, VVH1, and VWH1 and second U-, V-, and W-phase harmonic voltages VUH2, VVH2, and VWH2 in the 3-phase fixed coordinate system. In the present embodiment, the harmonic voltage calculation unit 30e includes a memory (e.g., a nonvolatile memory) as a storage device. Each of the harmonic voltages VUH1, VVH1, VWH1, VUH2, VVH2, and VVWH2 is stored in association with the command angular velocity ωtgt and the electric angle θe in the memory. The harmonic voltage calculation unit 30e will be described later in detail.

First U-, V-, and W-phase superimposition units 30fU, 30fV, and 30fW add the first U-, V-, and W-phase harmonic voltages VUH1, VVH1, and VWH1 to the U-, V-, and W-phase fundamental wave voltage VUB, VVB, and VWB. Second U-, V-, and W-phase superimposition units 30gU, 30gV, and 30gW add the second U-, V-, and W-phase harmonic voltages VUH2, VVH2, and VWH2 to the voltages "VUB+VUH1", "VVB+VVH1", and "VWB+VWH1" output from the first U-, V-, and W-phase superimposition units 30fU, 30fV, and 30fW. Output values from the second U-, V-, and W-phase superimposition units 30gU, 30gV, and 30gW serve as U-, V-, and W-phase command voltages VU, W, and VW. Note that, in the present embodiment, the superimposition units 30fU to 30fW and 30gU to 30gW correspond to "superimposition device".

A modulator 30h (corresponding to a "manipulation device") generates manipulation signals gU#, gV#, and gW# for causing U-, V-, and W-phase output voltages from the inverter 20 to serve as the U-, V-, and W-phase command voltages VU, W, and VW. In the present embodiment, the manipulation signals gU#, gV#, and gW# are generated by PWM processing based on a magnitude comparison between each of the command voltages VU, VV, and VW and a carrier signal (e.g., a triangular wave signal).

When a rotating field is generated in the motor 10, radial electromagnetic force fluctuations act on the rotor 14. When an electromagnetic force distribution of an attraction force and a repulsion force each acting on the rotor 14 coincides with the annular modes of the rotor 14, the noise (magnetic sound) of the motor 10 may increase. Here, the annular modes are modes of periodic fluctuations which occur in the rotor 14 as an elastic body due to an excitation force radially applied to the rotor 14. The following will describe the annular modes.

FIG. 3 shows first- to fourth-order annular modes. As shown in the drawings, the first-order annular mode is a mode in which the rotor 14 is displaced so as to vibrate/rotate on the basis of a node, while maintaining the shape (hereinafter referred to as the original shape) in a state where no excitation force is applied, which is shown by the broken line in the drawing. Here, the node is a portion shown by the two-dot-dash line in the drawing. The node portion scarcely changes from that in the original shape.

The second-order annular mode is a mode in which two portions spaced apart from each other by π radially extend from the original shape, while other two portions spaced apart from the extending portions by "π/2" radially contract from the original shape. Each of the portions which radially extend/contract is a "loop". The third-order annular mode is a mode in which the number of portions which simultaneously extend from the original shape is three. The fourth-order annular mode is a mode in which the number of portions which simultaneously extend from the original shape is four. Here, the excitation force in accordance with each of the annular modes is a force with which a value obtained by dividing one period of a mechanical angle by the period of the distribution of the attraction force and the repulsion force which are caused in one period of the mechanical angle by allowing a current which generates a rotational flux to flow in each of the stator winding wires 12 ¥ corresponds to the order of the annular mode. That is, the excitation force which provides, e.g., the second-order annular mode is a force with which, in one period of the mechanical angle, the angular intervals between the portions where the attraction force increases and the portions where the attraction force decreases are "π/2". Accordingly, the period of the above-mentioned distribution defined by the pair of portions where the attraction force increases is "π". Consequently, a value obtained by dividing one period "2π" of the mechanical angle by the period "π" of the above-mentioned distribution corresponds to the order "2" of the annular mode.

Each of the annular modes has a natural resonant frequency (resonant angular velocity). When the frequency of the excitation force in accordance with each of the annular modes approaches the resonant frequency in accordance with the annular mode, the phenomenon of resonance of the rotor 14 occurs. When the real frequency of the excitation force approaches the resonant frequency, the magnetic sound of the motor 10 increases to possibly cause a problem such as an increased noise level in an audible frequency range. In particular, in the present embodiment, when the frequency of the excitation force approaches the resonant frequency (e.g., 2300 Hz) in accordance with the second-order annular mode, the magnetic noise increases.

To cope with such a problem, the present embodiment has provided the harmonic voltage calculation unit 30e in the control apparatus 30. In the harmonic voltage calculation unit 30e, first and second v-phase harmonic voltages V¥H1 and V¥H2 for suppressing radial electromagnetic force fluctuations serving as a magnetic-sound-causing factor are stored. The following will describe harmonic voltages for suppressing electromagnetic force fluctuations.

Fundamental wave currents IUB, IVB, and IWB in the individual phases are represented by the following Equation (eq2). These fundamental wave currents IUB, IVB, and IWB have waveforms in which phases are shifted from each other by "2π/3" as the electric angle θe.

Equation 2

$$IUB = B \cdot \cos(\omega_e \cdot t) + C \cdot \sin(\omega_e \cdot t)$$
$$IVB = B \cdot \cos\left(\omega_e \cdot t + \frac{2}{3}\pi\right) + C \cdot \sin\left(\omega_e \cdot t + \frac{2}{3}\pi\right)$$
$$IWB = B \cdot \cos\left(\omega_e \cdot t - \frac{2}{3}\pi\right) + C \cdot \sin\left(\omega_e \cdot t - \frac{2}{3}\pi\right)$$

(eq2)

By way of example, the U-phase will be described below. As can be seen from the result obtained when the motor 10 is operated with the fundamental wave currents IUB, IVB, and IWB, to suppress noise, it is required to reduce the sixth-order component of the electromagnetic force, as described in Patent Literature 1 mentioned above. The sixth-order component is an electromagnetic force having a fluctuating angular velocity which is six times the fluctuating angular velocity of each of the fundamental wave currents flowing in the stator winding wires 12¥. Here, the electromagnetic force (nodal force) in the radial direction of the motor 10 is represented by F. Since the electromagnetic force F is generated by allowing the fundamental wave current to flow, the electromagnetic force F can be represented by the following Equation (eq3).

Equation 3

$$F(\omega_e \cdot t) = G(\omega_e \cdot t) \times \{B \cdot \cos(\omega_e \cdot t) + C \cdot \sin(\omega_e \cdot t)\}$$

(eq3)

It is known that the main components of the electromagnetic force F are electromagnetic forces of even-numbered orders such as second, fourth, and sixth orders. Accordingly, G in the Equation (eq3) shown above can be represented by the following Equation (eq4) as a periodic function of an odd-numbered order.

Equation 4

$$G(\omega e \cdot t) = \sum_{n=1}^{\infty} [a_{2n-1} \cdot \cos((2n-1)\omega e \cdot t) + b_{2n-1} \cdot \sin((2n-1)\omega e \cdot t)]$$

(eq4)

Typically, a motor is designed so as to obtain a large mean torque by allowing the fundamental wave currents. Accordingly, as the order of G is lower, the coefficients are set to larger values. Therefore, in the present embodiment, "n=1" is assumed to be satisfied in the Equation (eq4) shown above. Here, a harmonic current is represented by the following Equation (eq5).

Equation 5

$$IH = e \cdot \cos(\beta \cdot \omega_e \cdot t) + f \cdot \sin(\beta \cdot \omega_e \cdot t)$$

(eq5)

In the Equation (eq5) shown above, $\beta$ is an integer of 2 or more. By substituting the Equations (eq4) and (eq5) shown above in the Equation (eq3) shown above, a harmonic electromagnetic force FH can be represented by the following Equation (eq6).

Equation 6

$$FH = \left(\frac{a_1 \cdot e - b_1 \cdot f}{2}\right)\cos((1+\beta)\omega e \cdot t) +$$
$$\left(\frac{a_1 \cdot e + b_1 \cdot f}{2}\right)\cos((1-\beta)\omega e \cdot t) +$$
$$\left(\frac{a_1 \cdot f + b_1 \cdot e}{2}\right)\sin((1+\beta)\omega e \cdot t) +$$
$$\left(\frac{b_1 \cdot e - a_1 \cdot f}{2}\right)\sin((1-\beta)\omega e \cdot t)$$

(eq6)

Here, when "$\beta = 6M-1$" (M is an integer of 0 or more) is assumed to be satisfied, the Equation (eq6) shown above becomes the following Equation (eq7).

Equation 7

$$FH = \left(\frac{a_1 \cdot e - b_1 \cdot f}{2}\right)\cos(6M \cdot \omega e \cdot t) +$$
$$\left(\frac{a_1 \cdot e + b_1 \cdot f}{2}\right)\cos((6M-2)\omega e \cdot t) +$$
$$\left(\frac{a_1 \cdot f + b_1 \cdot e}{2}\right)\sin(6M \cdot \omega e \cdot t) +$$
$$\left(\frac{a_1 \cdot f + b_1 \cdot e}{2}\right)\sin((6M-2)\omega e \cdot t)$$

(eq7)

The Equations (eq5) and (eq7) shown above represent that, when a "6M−1"-th-order harmonic current is allowed to flow in each of the stator winding wires 12¥, a "6M"-th-order electromagnetic force and a "6M−2"-th-order electromagnetic force act on the motor 10 (rotor 14). Here, the "6M"-th-order electromagnetic force or harmonic current is an electromagnetic force or harmonic current having a fluctuating angular velocity corresponding to a value obtained by multiplying a fundamental angular velocity by "6M". The fundamental angular velocity is the fluctuating angular velocity $\omega e$ of the fundamental wave current flowing in each of the stator winding wires 12¥. The Equations (eq5) and (eq7) shown above show that, by allowing the "6M−1"-order harmonic current to flow in each of the stator winding wires 12¥, the "6M"th- and "6M−2"-th-order electromagnetic forces can be controlled. In the present embodiment, the coefficients e and f in the Equation (eq7) shown above are adjusted so as to reduce the "6M−2"-th-order electromagnetic force. However, the adjustment increases the "6M"-th-order electromagnetic force.

On the other hand, when "$\beta = 6M+1$" is assume to be satisfied, the Equation (eq6) shown above becomes the following Equation (eq8).

Equation 8

$$FH = \left(\frac{a_1 \cdot e - b_1 \cdot f}{2}\right)\cos((6M+2)\omega e \cdot t) +$$
$$\left(\frac{a_1 \cdot e + b_1 \cdot f}{2}\right)\cos(6M \cdot \omega e \cdot t) +$$
$$\left(\frac{a_1 \cdot f + b_1 \cdot e}{2}\right)\sin((6M+2)\omega e \cdot t) +$$
$$\left(\frac{a_1 \cdot f - b_1 \cdot e}{2}\right)\sin(6M \cdot \omega e \cdot t)$$

(eq8)

The Equations (eq5) and (eq8) shown above represent that, when a "6M+1"-th-order harmonic current is allowed to flow in each of the stator winding wires 12¥, the "6M"-th-order and "6M+2"-th-order electromagnetic forces act on the rotor 14. That is, the Equations (eq5) and (eq8) shown above represent that, by allowing the "6M+1"-th-order harmonic current to flow in each of the stator winding wires 12¥, the "6M"-th-order and "6M+2"-th-order electromagnetic forces can be controlled. In the present embodiment, the coefficients e and f in the Equation (eq8) shown above are adjusted so as to reduce the "6M"-th-order electromagnetic force which is increased by the superimposition of the "6M−1"-th-order harmonic current. However, the adjustment increases the "6M+2"-th-order harmonic current.

Figure 4:
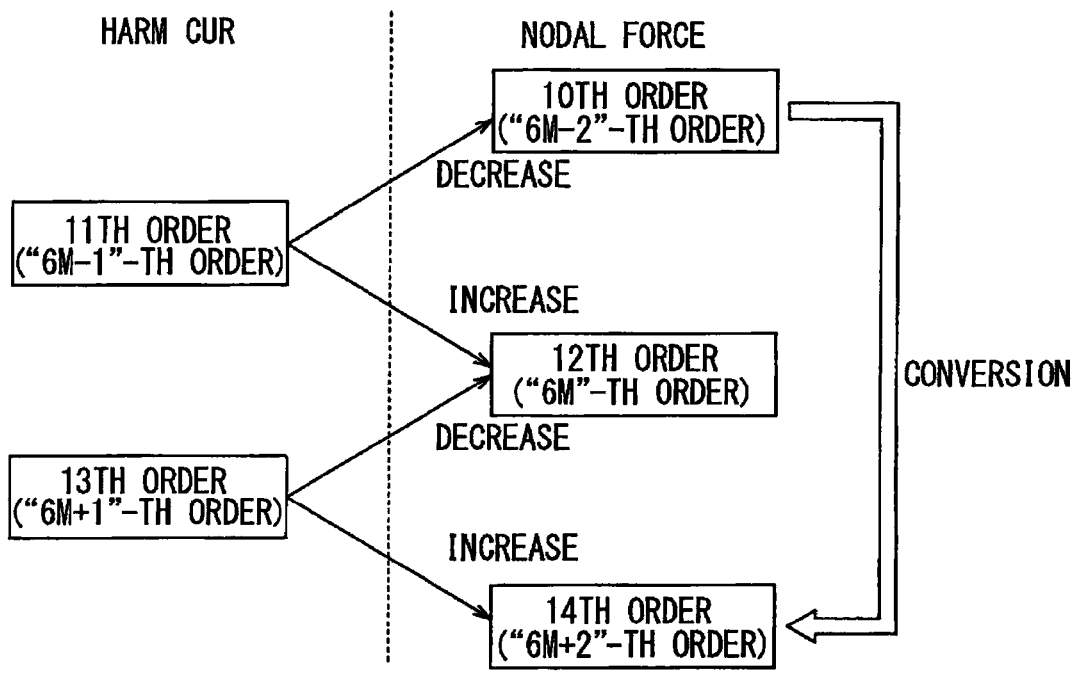
FIG. 4 is a diagram showing a method of converting a tenth-order electromagnetic force to a fourteenth-order electromagnetic force.

In the present embodiment, when the fluctuating angular velocity of a tenth-order electromagnetic force approaches a resonant angular velocity in accordance with the second-order annular mode, noise increases. To prevent this, on the basis of the items described above, "M=2" is assumed to be satisfied, as shown in FIG. 4, to convert the tenth-order electromagnetic force serving as a noise-causing factor to a twelfth-order electromagnetic force by the superimposition of an eleventh-order harmonic current. Here, in the present embodiment, the fluctuating angular velocity of the twelfth-order electromagnetic force also approaches the resonant angular velocity. Accordingly, the twelfth-order electromagnetic force is further converted to a fourteenth-order electromagnetic force by the superimposition of a thirteenth-order harmonic current. The fluctuating angular velocity of the fourteenth-order electromagnetic force has a value sufficiently away from the resonant angular velocity. As a result, noise can be reduced.

Figure 5:
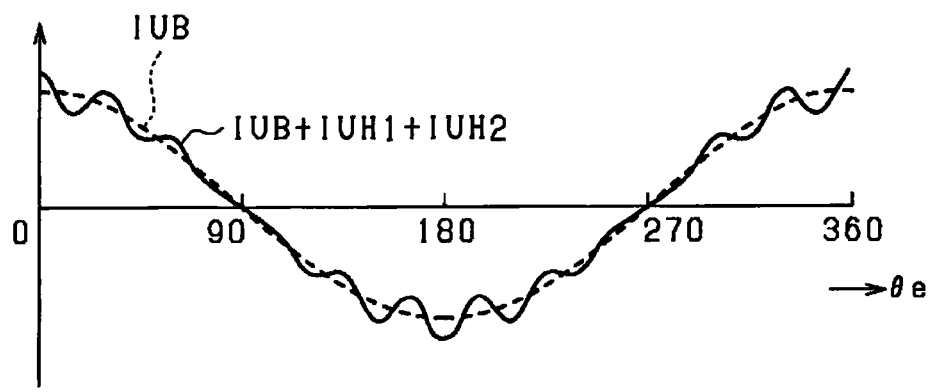
FIG. 5 is a diagram showing the transition of a fundamental wave current on which a harmonic current has been superimposed.

Thus, in the present embodiment, as shown in FIG. 5, the eleventh-order harmonic current (hereinafter referred to as a first harmonic current I¥H1) capable of reducing the tenth-order electromagnetic force, which is among the electromagnetic forces acting on the rotor 14, and the thirteenth-order harmonic current (hereinafter referred to as a second harmonic current I¥H2) capable of reducing the twelfth-order electromagnetic force, which is among the electromagnetic forces acting on the rotor 14 and increased by the superimposition of the eleventh-order harmonic current, are superimposed on a fundamental wave current I¥B. In FIG. 5, the mode of superimposition of each of the U-phase harmonic currents IUH1 and IUH2 is shown by way of example. The U-phase first harmonic current IUH1 and the U-phase second harmonic current IUH2 are respectively shown in the following Equations (eq9) and (eq10).

Equation 9

$$IUH1 = e1 \cdot \cos((6M-1)\omega_e \cdot t) + f1 \cdot \sin((6M-1)\omega_e \cdot t) = e1 \cdot \cos(11\omega_e \cdot t) + f1 \cdot \sin(11\omega_e \cdot t) \quad (eq9)$$

Equation 10

$$IUH2 = e2 \cdot \cos((6M+1)\omega_e \cdot t) + f2 \cdot \sin((6M+1)\omega_e \cdot t) = e2 \cdot \cos(13\omega_e \cdot t) + f2 \cdot \sin(13\omega_e \cdot t) \quad (eq10)$$

The first harmonic current I¥H1 has a waveform in which the phase and amplitude (represented by the respective coefficients e1 and f1) of the harmonic current shown in the Equation (eq9) shown above have been adjusted so as to reduce the tenth-order electromagnetic force. The U-, V-, and W-phase harmonic currents 1¥H1 have identically shaped waveforms and phases shifted from each other by "2π/3" as the electric angle θe. The same applies to the second harmonic currents I¥H2.

First harmonic voltages V¥H1 for allowing the first harmonic currents I¥H1 to flow in the stator winding wires 12¥ and second harmonic voltages V¥H2 for allowing the second harmonic currents I¥H2 to flow in the stator winding wires 12¥ are stored in the memory of the harmonic voltage calculation unit 30e. Specifically, in the harmonic voltage calculation unit 30e, as shown in the following Equations (eq11) and (eq12), the eleventh and thirteenth harmonic voltages VUH1, VVH1, and VVW1 are stored. Here, the conversion from the harmonic currents to the harmonic voltages can be performed on the basis of, e.g., a known voltage equation which associates the phase voltages applied to the motor with the phase currents.

Equation 11

$$\begin{aligned} VUH1 &= V11 \cdot \sin(11\omega_e \cdot t + \gamma) \\ VVH1 &= V11 \cdot \sin\left(11\omega_e \cdot t + \frac{2}{3}\pi + \gamma\right) \\ VWH1 &= V11 \cdot \sin\left(11\omega_e \cdot t - \frac{2}{3}\pi + \gamma\right) \end{aligned} \quad (eq11)$$

Equation 12

$$\begin{aligned} VUH2 &= V13 \cdot \sin(13\omega_e \cdot t + \delta) \\ VVH2 &= V13 \cdot \sin\left(13\omega_e \cdot t + \frac{2}{3}\pi + \delta\right) \\ VWH2 &= V13 \cdot \sin\left(13\omega_e \cdot t - \frac{2}{3}\pi + \delta\right) \end{aligned} \quad (eq12)$$

In the Equations (eq11) and (eq12) shown above, γ and δ show phase differences from the fundamental wave voltage in the Equation (eq1) shown above. The U-, V-, and W-phase first harmonic voltages V¥H1 are set so as to reduce the tenth-order electromagnetic force. Specifically, the first harmonic voltages V¥H1 have waveforms in each of which the phase γ and amplitude V11 of the harmonic current shown in the Equation (eq11) shown above have been adjusted so as to reduce the tenth-order electromagnetic force. In the present embodiment, the U-, V-, and W-phase first harmonic voltages V¥H1 have identically shaped waveforms and phases shifted from each other by "2π/3" as the electric angle θe. Also, the U-, V-, and W-phase second harmonic voltages V¥H2 are set so as to reduce the thirteenth-order electromagnetic force. Specifically, the second harmonic voltages V¥H2 have waveforms in which the phase δ and amplitude V13 of the harmonic current shown in the Equation (eq12) shown above have been adjusted so as to reduce the fourteenth-order electromagnetic force. In the present embodiment, the U-, V-, and W-phase second harmonic voltages I¥V2 have identically shaped waveforms and phases shifted from each other by "2π/3" as the electric angle θe.

In the present embodiment, each of the harmonic voltages V¥H1 and V¥H2 is associated with the command angular velocity ωtgt and the electric angle θe and stored as map data in the harmonic voltage calculation unit 30e. The harmonic voltage calculation unit 30e selects the corresponding harmonic voltages V¥H1 and V¥H2i¥ (on the basis of the command angular velocity ωtgt and the electric angle θe that have been input on an each-time basis (for example, in each control cycle of the control apparatus 30) and outputs the harmonic voltages V¥H1 and V¥H2i¥ to individual superimposition units 30f¥ and 30g¥. As a result, as previously shown in FIG. 5, the first and second harmonic currents can be superimposed on the fundamental wave currents.

Figure 6A:
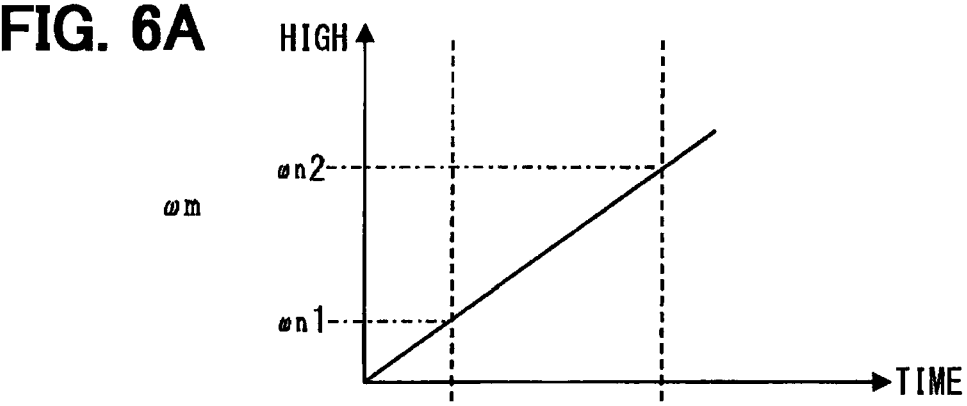
FIGS. 6A to 6C are timing charts showing an example of the modes of superimposition of harmonic voltages.
Figure 6B:
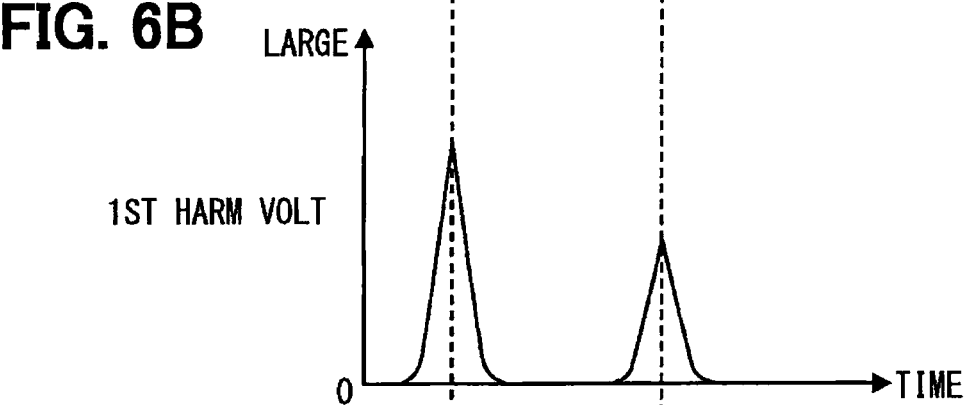
Figure 6C:
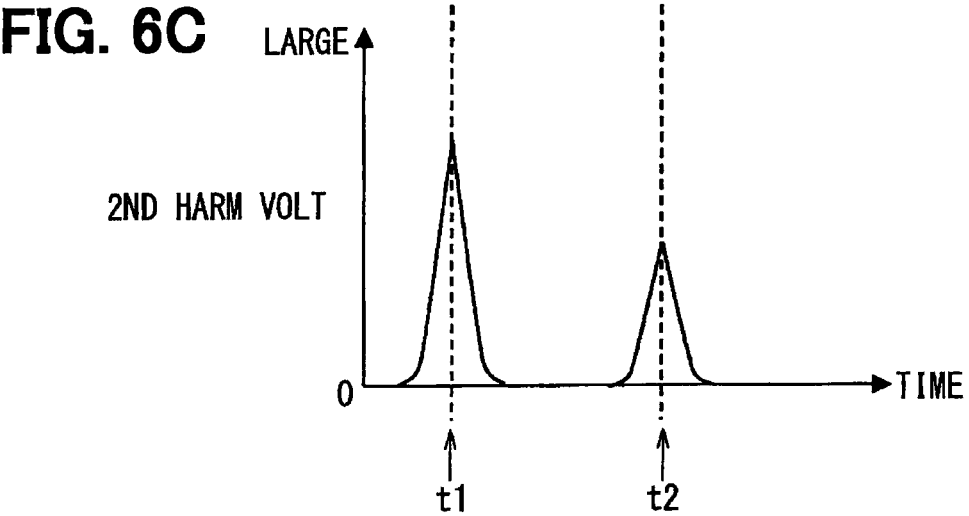

According to such a configuration, when a real rotational angular velocity ωm approaches the resonant angular velocity, the first and second harmonic voltages are superimposed on the fundamental wave voltages. When the real rotational angular velocity ωm comes away from the resonant angular velocity, the first and second harmonic voltages superimposed on the fundamental wave voltages decrease or become zero. Here, an example of the modes of superimposition of the individual harmonic voltages are shown in FIGS. 6A to 6C. Specifically, FIG. 6A shows the transition of the rotational angular velocity ωm. FIG. 6B shows the transition of the first harmonic voltage (e.g., effective value). FIG. 6C shows the transition of the second harmonic voltage (e.g., effective value). In each of FIGS. 6A to 6C, the case where the real rotational angular velocity ωm gradually increases is shown by way of example. As the real rotational angular velocity ωm approaches a first resonant angular velocity ωn1, the first and second harmonic voltages superimposed on the fundamental wave voltages gradually increase. At the time t1 when the real rotational angular velocity ωm equals the first resonant angular velocity ωn1, the first and second harmonic voltages have peak values. Then, as the real rotational angular velocity ωm comes away from the first resonant angular velocity ωn1, the first and second harmonic voltages decrease toward 0. Then, as the real rotational angular velocity ωm approaches a second resonant angular velocity ωn2 (>ωn1), the first and second harmonic voltages gradually increase. At the time t2 when the real rotational angular velocity ωm equals the second resonant angular velocity ωn2, the first and second harmonic voltages have peak values. Then, as the real rotational angular velocity ωm comes away from the second resonant angular velocity ωn2, the first and second harmonic voltages decrease toward 0.

Figure 7A:
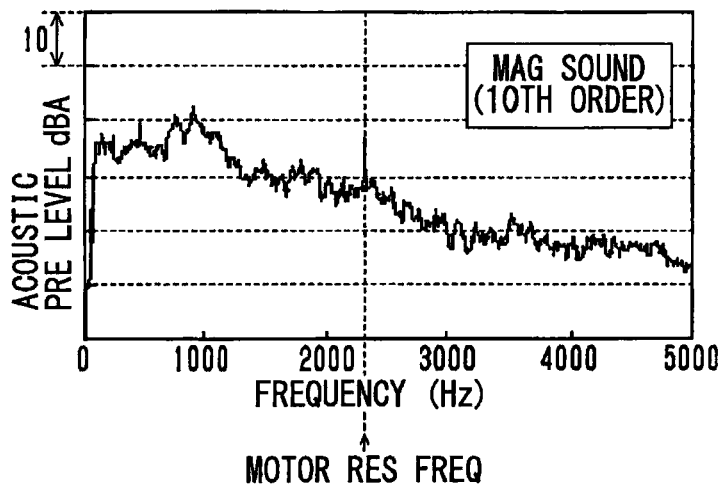
FIGS. 7A to 7C are diagrams showing the effect of reducing an acoustic pressure level in the case of superimposing the harmonic currents.
Figure 7B:
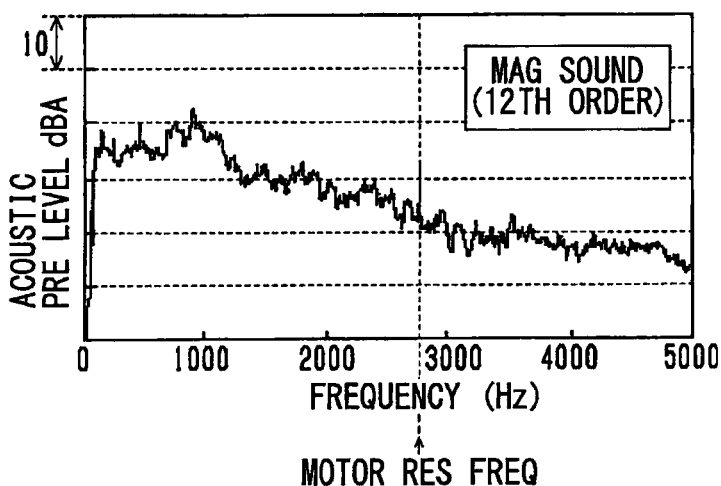
Figure 7C:
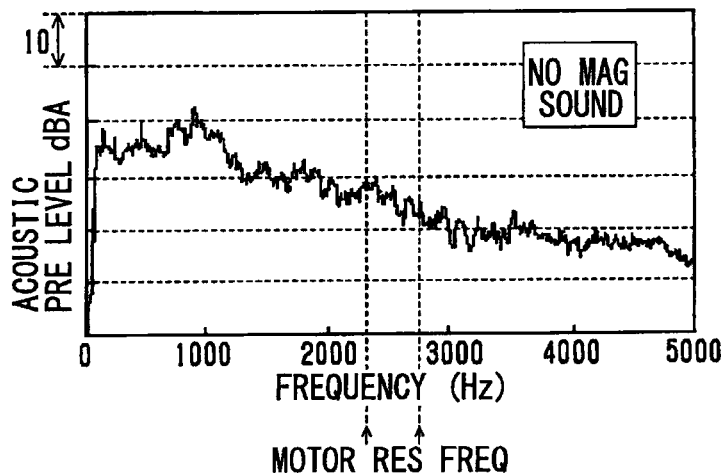

Using FIGS. 7A to 7C, the effect of the present embodiment will be described. Here, FIG. 7A shows the result of measuring noise when the first and second harmonic voltages V¥H1 and V¥H2 are not superimposed. As shown in FIG. 7A, in the present embodiment, when the fluctuating angular velocity of the tenth-order electromagnetic force approaches the resonant angular velocity, tenth-order noise increases. To reduce the tenth-order noise, the eleventh-order harmonic voltage is superimposed on the fundamental wave voltage, with the result shown in FIG. 7B. In FIG. 7B, the tenth-order noise is suppressed, while twelfth-order noise increases. To reduce the twelfth-order noise, the thirteenth-order harmonic voltage is further superimposed on the fundamental wave voltage, with the result shown in FIG. 7C. In FIG. 7C, the twelfth-order electromagnetic force is reduced to reduce twelfth-order noise. Here, by the superimposition of the thirteenth-order electromagnetic force, the fourteenth-order electromagnetic force is increased, but the fluctuating angular velocity of the fourteenth-order electromagnetic force is sufficiently away from the resonant angular velocity. Accordingly, fourteenth-order noise does not increase. Thus, the present embodiment can appropriately suppress the noise of the motor 10.

In addition, the present embodiment has used the concentrated-winding motor 10. In a concentrated-winding motor, noise is more likely to increase than in a distributed-winding motor. Therefore, the present embodiment gains a large advantage from the use of a configuration capable of converting an electromagnetic force.

Second Embodiment

Figure 8:
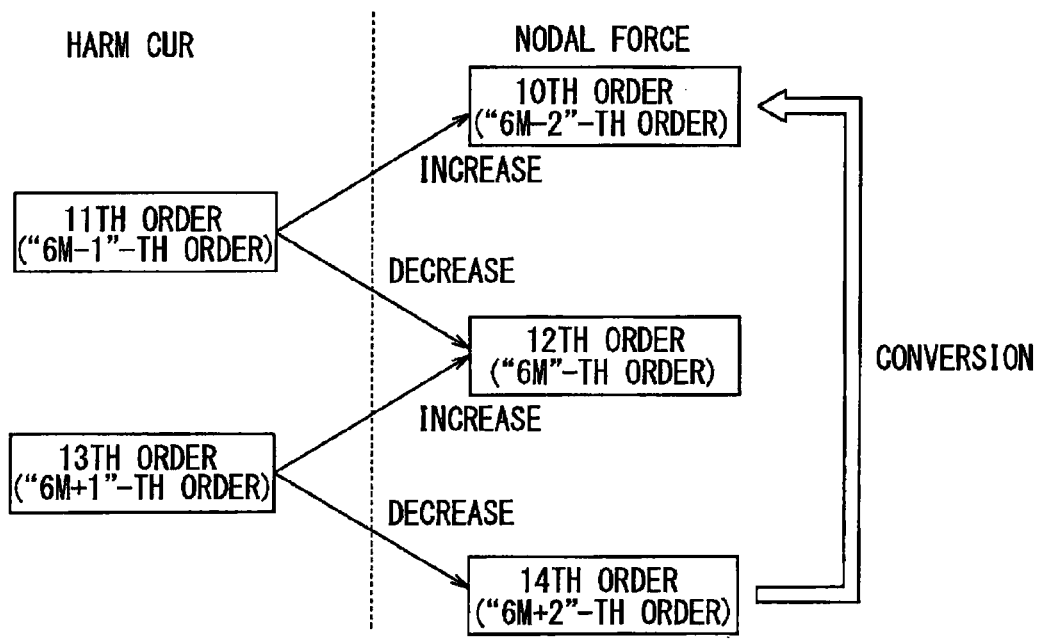
FIG. 8 is a diagram showing a method of converting a fourteenth-order electromagnetic force to a tenth-order electromagnetic force according to a second embodiment.

Referring to the drawings, the following will describe a second embodiment with a focus on the difference from the first embodiment described above. In the first embodiment described above, the tenth-order electromagnetic force is converted to the fourteenth-order electromagnetic force higher in order than the tenth-order electromagnetic force. Here, depending on the operating state of the motor 10, such as the rotational angular velocity of the motor 10, it is required to convert the fourteenth-order electromagnetic force to the tenth-order electromagnetic force lower in order than the fourteenth-order electromagnetic force. Accordingly, in the present embodiment, as shown in FIG. 8, the control apparatus 30 includes a second conversion function of converting the fourteenth-order electromagnetic force to the tenth-order electromagnetic force in addition to a first conversion function of converting the tenth-order electromagnetic force to the fourteenth-order electromagnetic force.

The following will describe the second conversion function. To reduce the fourteenth-order electromagnetic force, the first harmonic voltages V¥H1 have been set to the thirteenth-order harmonic voltages. However, by applying the first harmonic voltages V¥H1 to the stator winding wires 12¥, the twelfth-order electromagnetic force increases. Accordingly, to reduce the twelfth-order electromagnetic force, the second harmonic voltages V¥H2 have been set to the eleventh-order harmonic voltages. By applying the second harmonic voltages V¥H2 to the stator windings 12¥, the tenth-order electromagnetic force is increased, but the fluctuating angular velocity of the tenth-order magnetic force has a value sufficiently away from the resonant angular velocity.

Thus, in the present embodiment, depending on the operating state of the motor 10, the tenth-order electromagnetic force can be converted to the fourteenth-order electromagnetic force or the fourteenth-order electromagnetic force can be converted to the tenth-order electromagnetic force. This can appropriately suppress the noise of the motor 10.

Third Embodiment

Figure 9:
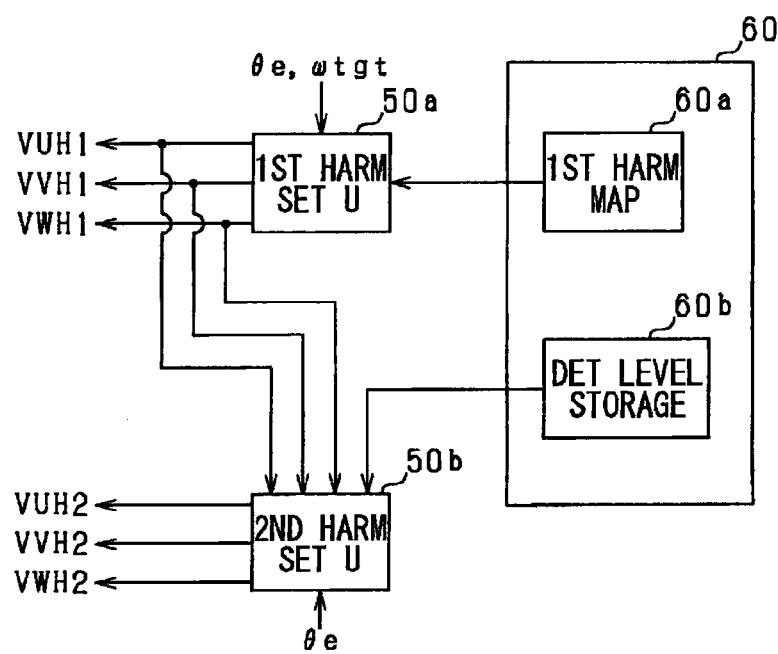
FIG. 9 is a block diagram showing a part of processing in a control apparatus 30 according to a third embodiment.

Referring to the drawings, the following will describe a third embodiment with a focus on the difference from the first embodiment described above. In the present embodiment, the method of setting the second harmonic voltages C¥H2 is changed. Consequently, as shown in FIG. 9, the control apparatus 30 includes a first harmonic setting unit 50a, a second harmonic setting unit 50b, and a memory 60 (e.g., nonvolatile memory) as a storage device instead of the harmonic voltage calculation unit 30e in FIG. 1 described above.

The first harmonic setting unit 50a receives the command angular velocity ωtgt and the electric angle θe each input thereto and sets the first harmonic voltages V¥H1 on the basis of a first harmonic map 60a. The first harmonic map 60a is the map data stored in advance in the memory 60 (corresponding to "information related to the first harmonic current"). In the first harmonic map 60a, the first harmonic voltages V¥1 are associated with the command angular velocity ωtgt and the electric angle θe. The first harmonic setting unit 50a selects the corresponding first harmonic voltages VUH1, VVH1, and VWH1 on the basis of the command angular velocity ωtgt and the electric angle θe each input on an each-time basis and sets the selected first harmonic voltages VUH1, VVH1, and VWH1 as harmonic voltages to be output to the respective superimposition units 30fU, 30fV, and 30fW.

The second harmonic setting unit 50b receives the first harmonic voltages V¥H1 set by the first harmonic setting unit 50*a* and a determination level each input thereto and calculates the second harmonic voltages V¥H2. The determination level is a parameter for specifying the degree to which the twelfth-order electromagnetic force (6M-th-order electromagnetic force) is to be reduced. In the present embodiment, the determination level has been stored in advance in a determination level storage unit 60*b* of the memory 60. In the present embodiment, the determination level has been set to a given value. Since each of the second harmonic voltages VUH2, VVH2, and VWH2 calculated by the second harmonic setting unit 50*b* has been associated with the electric angle eθ, the second harmonic setting unit 50*b* receives the electric angle eθ input thereto and outputs the calculated second harmonic voltages VUH2, VVH2, and VWH2 to the respective superimposition units 30*g*U, 30*g*V, and 30*g*W.

Subsequently, the following will describe a method of calculating the second harmonic voltages V¥H2 in the second harmonic setting unit 50*b*. The calculation method is characterized by reliably reducing the twelfth-order electromagnetic force which is increased by the superimposition of the first harmonic voltages V¥H1 and reliably reducing the twelfth-order noise. The following will describe a reduction-allowed region R where the effect of reducing the twelfth-order electromagnetic force can be obtained and then describe the method of calculating the second harmonic voltages V¥H2.

Figure 10:
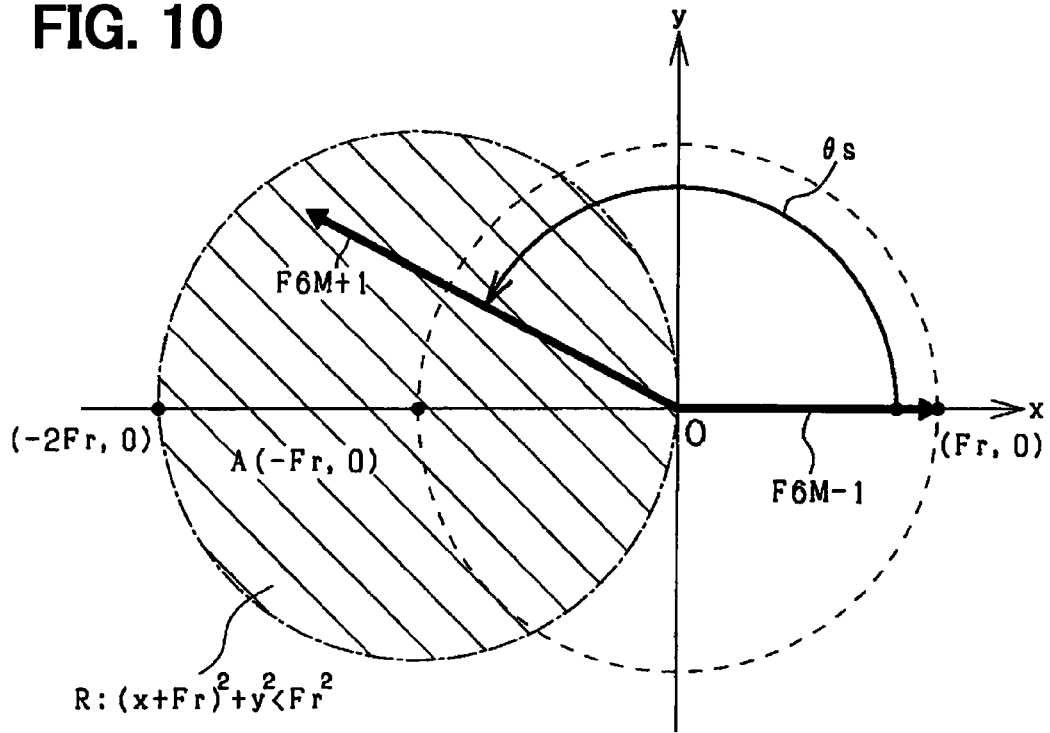
FIG. 10 is a diagram showing a region where an electromagnetic force can be reduced.

First, using FIG. 10, the reduction-allowed region R will be described. In the xy orthogonal coordinate system shown in FIG. 10, "F6M−1" shows a twelfth-order electromagnetic force vector (hereinafter referred to as the first vector) generated by superimposing the eleventh-order first harmonic voltages V¥H1 on the stator winding wires 12¥. On the other hand, "F6M+1" shows a twelfth-order electromagnetic force vector (hereinafter referred to as the second vector) generated by superimposing the thirteenth-order second harmonic voltages V¥H2 on the stator winding wires 12¥.

The first vector "F6M−1" extends from the origin O of the coordinate system along an x-axis. The second vector "F6M+1" extends from the origin O. An angle θs formed between the first and second vectors "6M−1" and "6M+1" when the second vector "F6M+1" rotates in a counterclockwise direction relative to the x-axis is defined as a positive value. In the coordinate system, the point of intersection between a reference axis line extending from the origin O in a direction opposite to the extending direction of the first vector "R6M−1" and a circle around the origin O having a radius corresponding to a magnitude (amplitude) Fr of the first vector "F6M−1" is defined as a reference center A. Also, in the coordinate system, the region (region hatched in the drawing) inside the circumference of the circle around the reference center A having a radius corresponding to the magnitude Fr of the first vector "6M−1" is defined as the reduction-allowed region R.

By applying the second harmonic voltages V¥H2 which locate the front end of the second vector "F6M+1" in the reduction-allowed region R to the stator winding wires 12¥, the magnitude of a resultant vector Ft of the first and second vectors "F6M−1" and "F6M+1" can be reduced to be smaller than the magnitude Fr of the first vector "F6M−1". That is, the twelfth-order electromagnetic force can be reduced.

Figure 11:
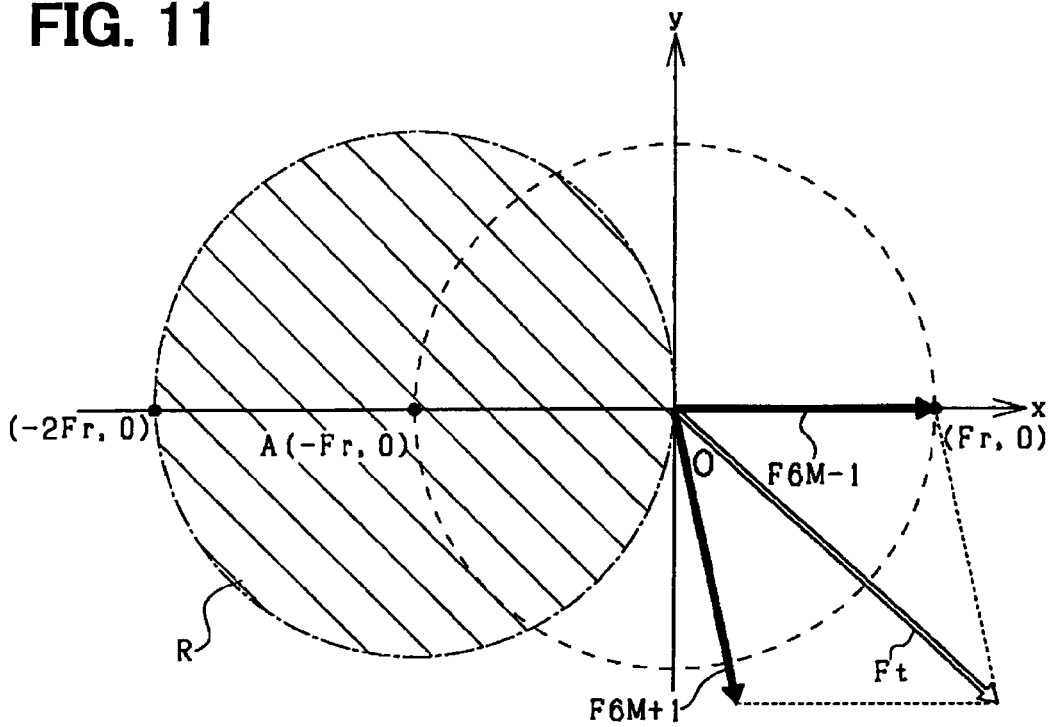
FIG. 11 is a diagram showing an example of the case where an electromagnetic force reducing effect cannot be obtained.

By contrast, as shown in FIG. 11, when the second harmonic voltages V¥H2 which locate the front end of the second vector "F6M+1" outside the reduction-allowed region R to the stator winding wires 12¥, the magnitude of the resultant vector Ft increases to be larger than the magnitude Fr of the first vector "F6M−1". As a result, the effect of reducing noise cannot be obtained.

It is assumed here that the present embodiment uses the area of the reduction-allowed region R in which the front end of the second vector "F6M+1" can be located in the range of the angle θs from 120° to 240°. To locate the front end of the second vector "F6M+1" in the area, a predetermined relationship needs to be established between the angle θs and an amplitude ratio Ratio having a value obtained by dividing the magnitude of the second vector "F6M+1" by the magnitude Fr of the first vector "F6M−1". This is because the x-axis component of the second vector "F6M+1" contributes to a reduction in the magnitude Fr of the first vector "6M−1". Using FIGS. 12 to 14, the following will describe the relationship between the angle θs and the amplitude ratio Ratio.

Figure 12:
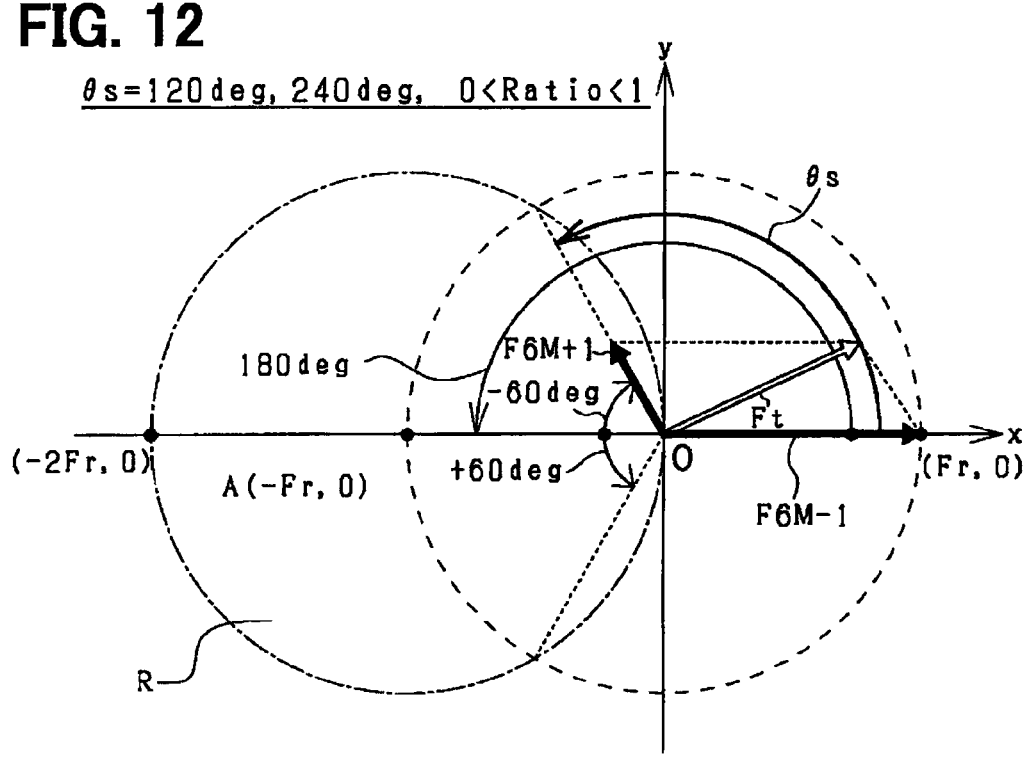
FIG. 12 is a diagram showing an example of the mode of an electromagnetic force reduction (θs=120°, 240°)

As shown in FIG. 12, when the angle θs is 120° or 240°, it is necessary to satisfy a first condition under which the amplitude ratio Ratio is set larger than 0 and less than 1.

Figure 13:
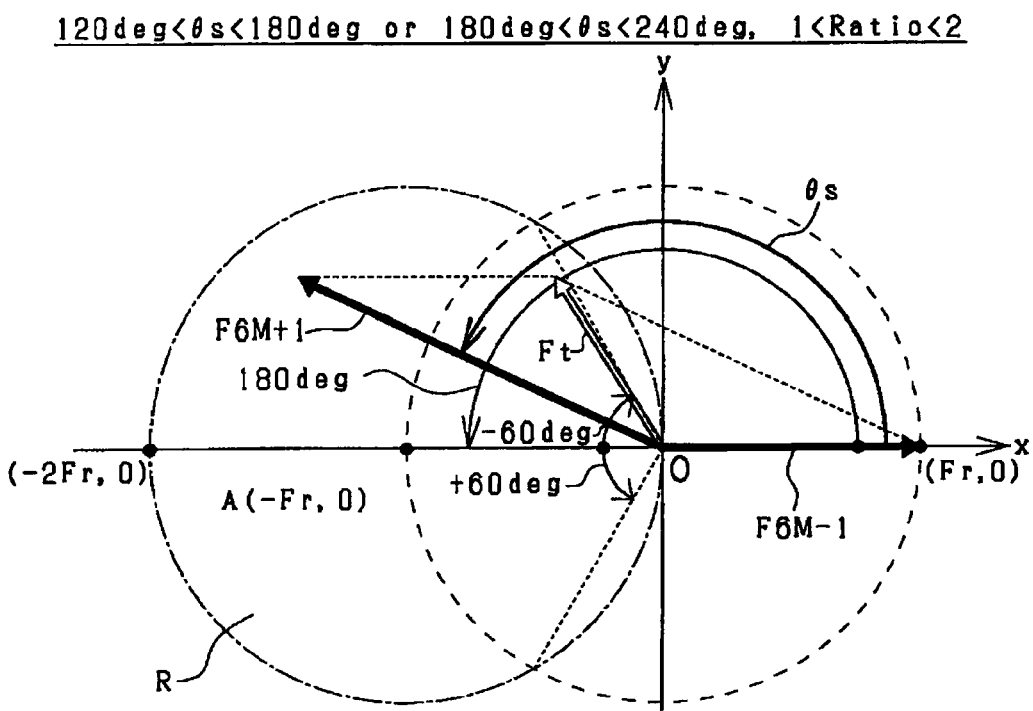
FIG. 13 is a diagram showing an example of the mode of the electromagnetic force reduction (120°<θs<180°, 180°<θs<240°)

As shown in FIG. 13, when the angle θs is larger than 120° and less than 180° or when the angle θs is larger than 180° and less than 240°, it is necessary to satisfy a second condition under which the amplitude ratio Ratio is set larger than 1 and less than 2.

Figure 14:
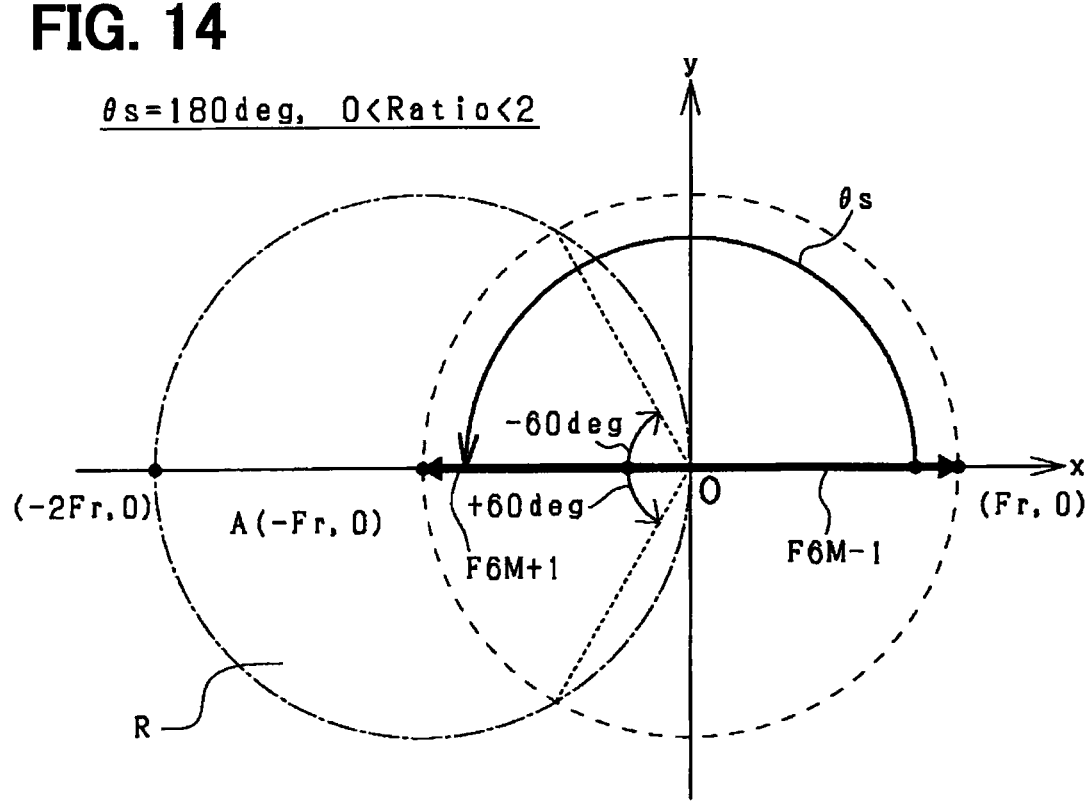
FIG. 14 is a diagram showing an example of the mode of the electromagnetic force reduction (θs=180°)

As shown in FIG. 14, when the angle θs is 180°, it is necessary to satisfy a third condition under which the amplitude ratio Ratio is set larger than 0 and less than 2.

The following will describe a method of calculating the second harmonic voltages V¥H2. The second harmonic setting unit 50*b* calculates the second harmonic voltages V¥H2 which satisfy any one of the first to third conditions described above on the basis of the first harmonic voltages V¥H1 set by the first harmonic setting unit 50*a* and the determination level. The first harmonic voltages V¥H1 are used herein for the purpose of recognizing the angle θs formed between the second vector "6M+1" and the first vector "6M−1" which are generated by applying the second harmonic voltages V¥H2 and the magnitude Fr of the first vector "6M−1".

The determination level is used to recognize to what degree the magnitude of the resultant vector Ft is to be reduced relative to the magnitude Fr of the first vector "6M−1". The determination level indicates that, as the value of the determination level is smaller, the relative magnitude of the resultant vector Ft to the magnitude Fr of the first vector "6M−1" is reduced to be smaller. For example, when the determination level can. have values of 0 to 100%, the determination level having a value of 100% shows that the magnitude Fr of the resultant vector Ft is set equal to the magnitude Fr of the first vector "6M−1" and the determination level having a value of 0% shows that the magnitude of the resultant vector Ft is set to 0.

Figure 15A:
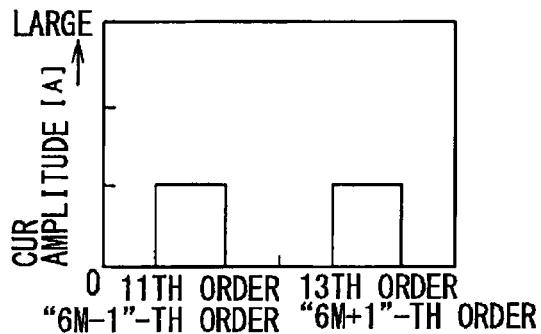
FIGS. 15A to 15F are diagrams showing an effect according to the third embodiment (θs=180°)
Figure 15B:
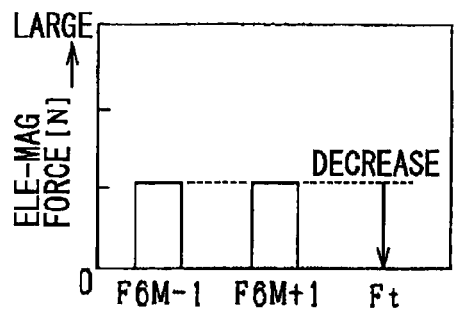
Figure 15C:
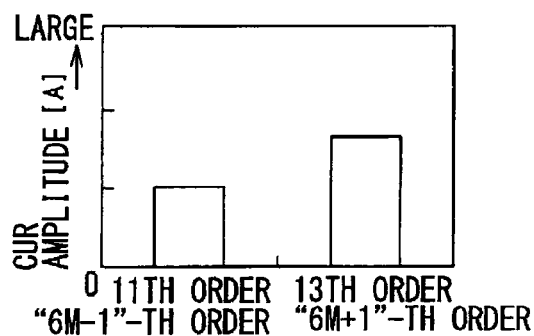
Figure 15D:
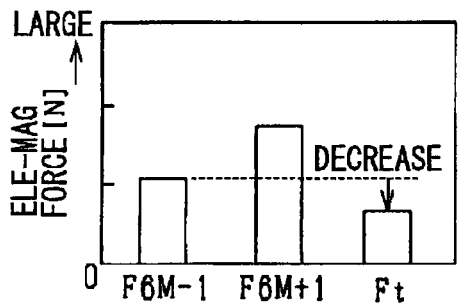
Figure 15E:
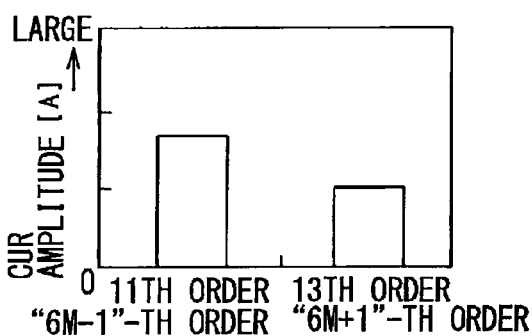
Figure 15F:
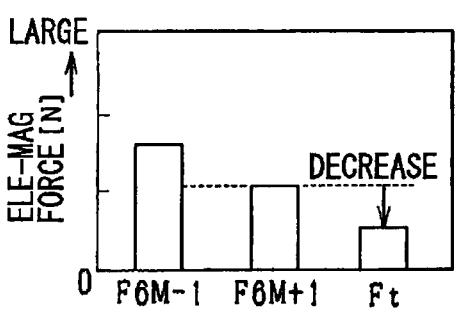
Figure 16A:
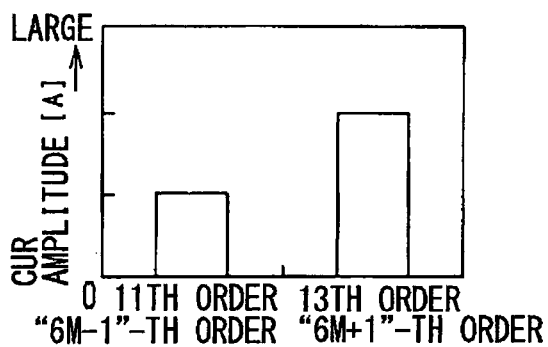
FIGS. 16A to 16F are diagrams showing the case where an electromagnetic force reducing effect according to a related-art technique cannot be obtained (θs=180°)
Figure 16B:
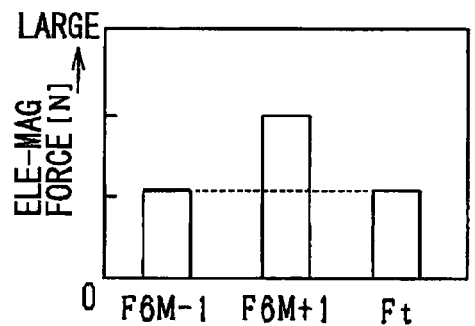
Figure 16C:
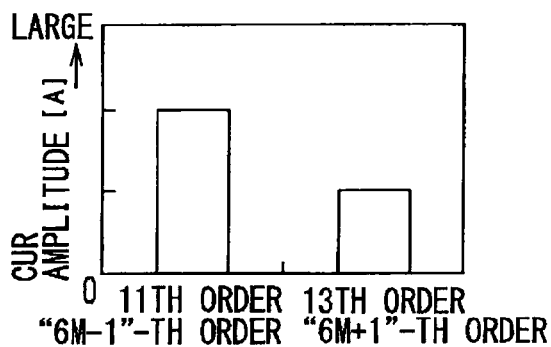
Figure 16D:
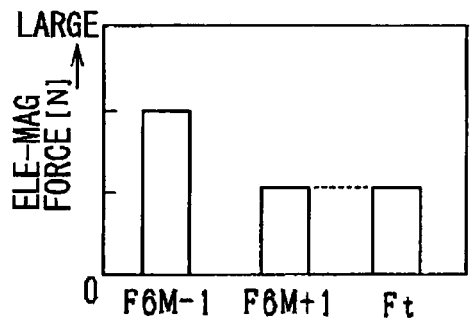
Figure 16E:
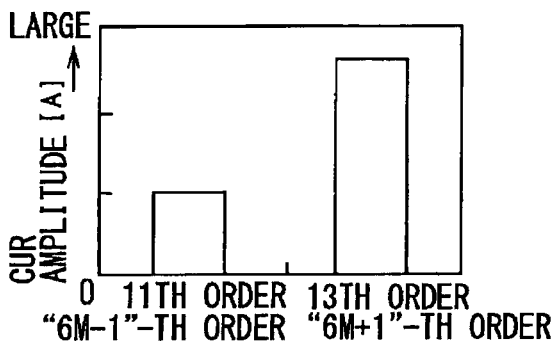
Figure 16F:
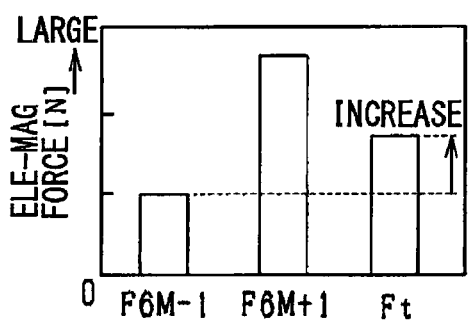

FIG. 15A to 15F show the effect of reducing the twelfth-order electromagnetic force in the case of applying the eleventh-order first harmonic voltages V¥H1 and the thirteenth-order second harmonic voltages V¥YH2 which satisfy the third condition shown above when the angle θs is 180°. As shown in FIGS. 15A and 15B, by applying the second harmonic voltages V¥H2 each having the amplitude ratio Ratio of 1 to the stator winding wires 12¥, the magnitude of the resultant vector Ft can be set to 0. Also, as shown in FIGS. 15C and 15D, by applying the second harmonic voltages V¥H2 each having the amplitude ratio Ratio of 2, the magnitude of the resultant vector Ft can be reduced. Also, as shown in FIGS. 15E and 15F, by applying the second harmonic voltages V¥H2 each having the amplitude ratio Ratio of 0.5, the magnitude of the resultant vector Ft can be reduced.

FIGS. 16A to 16F show the twelfth-order electromagnetic force related to a related art technique when the angle θs is 180°. The related art technique refers to a configuration in which the front end of the second vector "F6M+1" is not located in the reduction-allowed region R. As shown in the drawing, in the related-art technique, the magnitude of the resultant vector Ft cannot be reduced to be smaller than the magnitude Fr of the first vector "F6M−1". That is, the effect of reducing the twelfth-order electromagnetic force cannot be obtained.

Thus, the present embodiment has used the configuration which calculates the second harmonic voltages V¥H2 on the basis of the first harmonic voltages V¥H1 and the determination level. The configuration is used to easily implement a configuration for reducing the twelfth-order electromagnetic force. That is, depending on the specifications of a vehicle in which the motor control system is mounted, the specifications of the motor control system, or the like, the resonant angular velocity and a resonance level at the resonant angular velocity differ. Consequently, the second harmonic voltages V¥H2 for controlling the noise level to a tolerable noise level or lower differ depending on the specifications of the vehicle, the specifications of the motor control system, or the like. Accordingly, in the configuration which stores the second harmonic voltages V¥H2 as the map data in the memory 60, to reduce the noise level to the tolerable noise level or lower for each set of specifications, the map data needs to be rewritten for each set of specifications of a mass-produced product. However, in this case, the number of process steps for rewriting increases.

To cope with such a problem, it may also be considered to, e.g., produce map data for those of the second harmonic voltages V¥H2 according to the different sets of specifications with which the magnitude of the resultant vector Ft is reduced to the largest degree and use the map data as map data common to the different sets of specifications. However, in this case, depending on the specifications of a product, an overengineered product having a real noise level significantly below the tolerable noise level may be produced. In the overengineered product, the noise level is excessively reduced to be lower than the tolerable noise level so that harmonic currents uselessly flow in the motor 10.

To prevent this, the present embodiment has used a configuration in which the second harmonic setting unit 50b calculates the second harmonic voltages V¥H2 on the basis of the first harmonic voltages V¥H1 and the determination level without converting the second harmonic voltages V¥H2 to map data. Here, the determination level stored in the memory 60 may be changed appropriately in accordance with the specifications of a product. By using information related to the first to third conditions described above and allowing the degree to which the magnitude of the resultant vector Ft is to be reduced to be specified on the basis of the determination level, it is possible to easily implement a configuration which reduces the twelfth-order electromagnetic force without rewriting the map data of the second harmonic voltages V¥H2 or allowing harmonic currents to uselessly flow in the motor 10 even when the specifications differ. In addition, according to the present embodiment, unlike the first harmonic voltages V¥H1, the second harmonic voltages V¥H2 need not be converted to map data.

Fourth Embodiment

Figure 17:
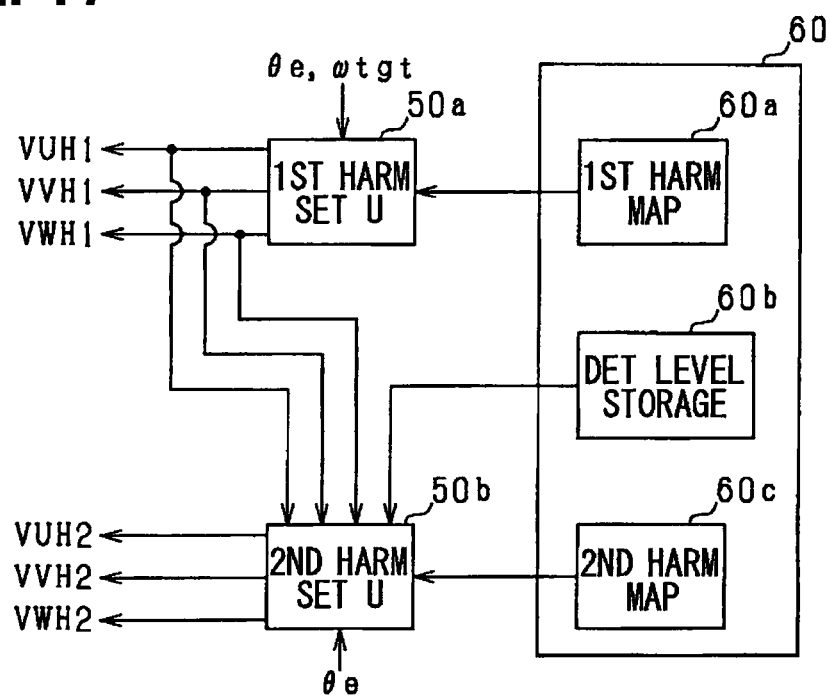
FIG. 17 is a block diagram showing a part of processing in the control apparatus 30 according to a fourth embodiment.

Referring to the drawings, the following will describe a fourth embodiment with a focus on the difference from the third embodiment described above. In the present embodiment, a method of processing in the second harmonic setting unit 50b is changed. FIG. 17 shows the portions of the processing performed by the control apparatus 30 which are related to the setting of the harmonic voltages V¥H1 and V¥H2. Note that, in FIG. 17, for the sake of convenience, the same components as the components shown above in FIG. 9 are designated by the same reference numerals.

As shown in the drawing, in the memory 60, a second harmonic map 60c has been stored in advance. In the present embodiment, the second harmonic map 60c is map data corresponding to information related to the second harmonic currents. Specifically, the second harmonic map 60c is map data which determines, in the relationship with the first harmonic voltages V¥H1, the second harmonic voltages V¥H2 which satisfy the first to third conditions described above in the third embodiment described above.

The second harmonic setting unit 50b receives the first harmonic voltages V¥H1 set by the first harmonic setting unit 50a and the determination level each input thereto and retrieves, from the second harmonic map 60c, the second harmonic voltages V¥H2 which satisfy any one of the first to third conditions. Since each of the second harmonic voltages VUH2, VVH2, and VWH2 retrieved by the second harmonic setting unit 50b has been associated with the electric angle θe, the second harmonic setting unit 50b receives the electric angle θe input thereto and outputs the retrieved second harmonic voltages VUH2, VVH2, and VWH2 to the respective superimposition units 30gU, 30gV, and 30gW.

According to the present embodiment described above, even when the specifications of a vehicle or the like differ, it is possible to easily implement a configuration which reduces the twelfth-order electromagnetic force without rewriting the map data of the second harmonic voltages V¥H2 or allowing harmonic currents to uselessly flow in the motor 10.

Other Embodiments

Note that each of the embodiments described above may also be modified as follows and practiced.

In the embodiments described above, to convert the tenth-order electromagnetic force (first electromagnetic force) to the fourteenth-order electromagnetic force (second electromagnetic force), the eleventh- and thirteenth-order two harmonic currents are superimposed on the fundamental wave currents. However, the harmonic currents superimposed on the fundamental wave currents are not limited thereto. For example, three or more harmonic currents may also be superimposed on the fundamental wave currents. Specifically, when, e.g., the electromagnetic force in the vicinity of the resonant angular velocity is the fourth-order electromagnetic force, to convert the fourth-order electromagnetic force to the twelfth-order electromagnetic force significantly away from the resonant angular velocity, the fifth-, seventh-, ninth-, and eleventh-order four harmonic currents which are harmonic currents of all the odd-numbered orders included in the range from the fourth order to the twelfth order may be superimposed appropriately on the fundamental wave currents.

In the second embodiment described above, when, e.g., the electromagnetic force in the vicinity of the resonant angular velocity is the tenth-order electromagnetic force, to convert the tenth-order electromagnetic force to the second-order electromagnetic force significantly away from the resonant angular velocity, the ninth-, seventh-, fifth-, and third-order harmonic currents which are harmonic currents of all the odd-numbered orders included in the range from the tenth order to the second order may also be superimposed appropriately on the fundamental wave current.

The fluctuating angular velocity of the first electromagnetic force serving as a noise-causing factor, the fluctuating angular velocity of the second electromagnetic force to which the first electromagnetic force has been converted, and the plurality of harmonic currents for converting the first electromagnetic force to the second electromagnetic force are not limited to those shown by way of example in each of the embodiments described above.

In the third and fourth embodiments described above, the determination level stored in the memory 60 is changed on the basis of the specifications of the vehicle or the specifications of the motor control system. However, the basis on which the determination level is changed is not limited thereto. For example, even when the specifications are the same, the resonant angular velocity or the resonance level at the resonant angular velocity may slightly differ depending on the difference between the individual products. In this case, the determination level stored on the memory 60 may also be changed on the basis of the difference between the individual products.

In the third and fourth embodiments described above, the determination level has a given value, but the determination level is not limited thereto. The determination level may also be set variable. In this case, the determination level associated with a parameter which affects the determination level is stored in advance in the determination level storage unit 60b. The determination level storage unit 60b may appropriately receive the above-mentioned parameter input thereto and set the determination level variable. Examples of the above-mentioned parameter mentioned above include the torque and temperature of the motor 10.

In the third embodiment described above, the map data stored in the memory 60 is not limited to that of the harmonic voltages and may also be that of harmonic currents. In this case, e.g., the first harmonic setting unit 50a may appropriately convert the first harmonic currents selected from the map data to the first harmonic voltages on the basis of the voltage equation of the motor and output the first harmonic voltages to which the first harmonic currents have been converted to the respective superimposition units 30fU, 30fV, and 30fW. Note that the same applies to the fourth embodiment described above.

The third embodiment described above has used the configuration which converts the tenth-order electromagnetic force to the fourteenth-order electromagnetic force, but the configuration is not limited thereto. For example, it may also be possible to use a configuration which converts the fourteenth-order electromagnetic force to the tenth-order electromagnetic force or a configuration having each of the function of converting the tenth-order electromagnetic force to the fourteenth-order electromagnetic force and the function of converting the fourteenth-order electromagnetic force to the tenth-order electromagnetic force. Note that the same applies to the fourth embodiment described above.

The controlled variable of the motor is not limited to a rotational angular velocity and may also be, e.g., a torque.

The motor is not limited to a concentrated-winding motor, and a distributed-winding motor may also be used. The motor is also not limited to an outer-rotor-type motor, and an inner-rotor-type motor may also be used. Even when the winding type or the rotor type is different, as long as the phenomenon of resonance of a rotor causes noise, the application of the present disclosure is effective. The noise of the motor is not limited to that caused by the phenomenon of resonance of the rotor. It can be considered that the noise of the motor is caused by the phenomenon of resonance of the stator or each of the stator and the rotor. In this case also, the application of the present disclosure is effective.

The motor is also not limited to a three-phase motor and may also be a multi-phase motor having four or more phases. Moreover, the motor is also not limited to a permanent magnet field synchronous motor having permanent magnets provided in a rotor and may also be, e.g., a winding field synchronous motor including a field winding wire around a rotor. Furthermore, the motor is also not limited to a blower motor.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. A control apparatus for a rotating machine in a system including the rotating machine having a stator, around which a winding wire is wound, and a power conversion circuit electrically connected to the rotating machine to apply a voltage to the winding wire, wherein a fluctuating angular velocity of a fundamental wave current flowing in the winding wire is defined as a fundamental angular velocity, wherein a current having a fluctuating angular velocity obtained by multiplying the fundamental angular velocity by an integer equal to or more than 2, which is defined as K, is defined as a K-th order harmonic current, and wherein an electromagnetic force acting on the rotating machine and having the fluctuating angular velocity obtained by multiplying the fundamental angular velocity by the integer is defined as a K-th order electromagnetic force, the control apparatus comprising:

a superimposition device that superimposes a plurality of harmonic currents, for converting a first electromagnetic force to a second electromagnetic force, on the fundamental wave current, the first electromagnetic force being a second or higher order electromagnetic force as a reduction object, the second electromagnetic force being a second or higher order electromagnetic force and different from the first electromagnetic force, an order of each harmonic current being disposed in a range between an order of the first electromagnetic force and an order of the second electromagnetic force; and a manipulation device that operates the power conversion circuit so as to flow the fundamental wave current, on which the plurality of harmonic currents are superimposed, in the winding wire.

2. The control apparatus according to claim 1, wherein the order of the first electromagnetic force is defined as 6×M+2×L, wherein M is an integer, and L is an integer, wherein the order of the second electromagnetic force is defined as 6×M+2×N, wherein N is an integer different from L, and wherein the superimposition device superimposes all of the plurality of harmonic currents having odd number orders, which is disposed in a range between (6×M+2×L)-th order and (6×M+2×N)-th order.

3. The control apparatus according to claim 2, wherein L is −1, and N is +1, and
wherein the superimposition device superimposes a (6×M−1)-th order harmonic current and a (6×M+1)-th order harmonic current on the fundamental wave current so that the first electromagnetic force having a (6×M−2)-th order is converted to the second electromagnetic force having a (6×M+2)-th order.

4. The control apparatus according to claim 2, wherein L is −1 and +1, and N is +1 and −1,
wherein the superimposition device superimposes a (6×M−1)-th order harmonic current and a (6×M+1)-th order harmonic current on the fundamental wave current so that the first electromagnetic force having a (6×M−2)-th order is converted to the second electromagnetic force having a (6×M+2)-th order, and
wherein the superimposition device superimposes a (6×M+1)-th order harmonic current and a (6×M−1)-th order harmonic current on the fundamental wave current so that the first electromagnetic force having a (6×M+2)-th order is converted to the second electromagnetic force having a (6×M−2)-th order.

5. The control apparatus according to claim 3,
wherein one of the (6×M−1)-th order harmonic current and the (6×M+1)-th order harmonic current is defined as a first harmonic current, and the other of the (6×M−1)-th order harmonic current and the (6×M+1)-th order harmonic current is defined as a second harmonic current,
wherein, when the first harmonic current flows through the winding wire, an electromagnetic force is generated, and the electromagnetic force represents a first vector, which extends from an original point of a biaxial orthogonal coordinate system,
wherein, when the second harmonic current flows through the winding wire, another electromagnetic force is generated, and the another electromagnetic force represents a second vector, which extends from the original point of the biaxial orthogonal coordinate system,
wherein a reference axis extends from the original point of the biaxial orthogonal coordinate system toward a direction opposite to the first vector,
wherein the reference axis intersects with a circle, which has a radius equal to a magnitude of the first vector and around the original point as a center, at an intersection point as a reference center, and
wherein a region located inside of a circumference of another circle having a radius equal to the magnitude of the first vector around the reference center is defined as a reduction allowance region,
the control apparatus further comprising:
a storage device that stores information related to the first harmonic current in association with a rotation speed of the rotating machine;
a first determination device hat determines the first harmonic current flowing in the winding wire according to the rotation speed and the information related to the first harmonic current and stored in the storage device; and
a second determination device that determines the second harmonic current, which controls a front end of the second vector to be disposed in the reduction allowance region, according to the first harmonic current determined by the first determination device, wherein the superimposition device superimposes the first harmonic current determined by the first determination device and the second harmonic current determined by the second determination device on the fundamental wave current.

6. The control apparatus according to claim 5,
wherein the storage device stores a determination level indicative of information for specifying a reduction degree of the magnitude of the first vector, and
wherein the second determination device determines the second harmonic current based on the first harmonic current and the determination level.

7. The control apparatus according to claim 6,
wherein an angle between the first vector and the second vector with reference to the extending direction of the first vector is defined as a positive value when the second vector rotates around the original point in a counterclockwise direction, and
wherein the second determination device determines the second harmonic current to satisfy any one of a first condition, a second condition and a third condition according to the first harmonic current and the determination level,
wherein the first condition is such that an amplitude ratio obtained by dividing a magnitude of the second vector by the magnitude of the first vector is larger than 0 and less than 1 when the angle is 120° or 240°,
wherein the second condition is such that the amplitude ratio is larger than 1 and less than 2 when the angle is larger than 120° and less than 180° or when the angle is larger than 180° and less than 240°, and
wherein the third condition is such that the amplitude ratio is larger than 0 and less than 2 when the angle is 180°.

8. The control apparatus according to claim 7,
wherein the second determination device provides a determined second harmonic current as the harmonic current to flow in the winding wire.

9. The control apparatus according to claim 7,
wherein the storage device stores information of the second harmonic current in association with the rotation speed of the rotating machine,
wherein the second determination device retrieves the information of the second harmonic current, which satisfies any one of the first condition, the second condition and the third condition, from the information of the second harmonic current stored in the storage device according to the first harmonic current and the determination level, and
wherein the second determination device determines the second harmonic current flowing in the winding wire according to retrieved information of the second harmonic current.

10. The control apparatus according to claim 1, further comprising:
a fundamental wave calculation device that calculates a fundamental wave component of a phase voltage in the rotating machine for controlling a control value of the rotating machine to be a command value, the fundamental wave component providing to flow the fundamental wave current in the winding wire; and
a harmonic calculation device that calculates a harmonic component of the phase voltage in the rotating machine to flow the harmonic current in the winding wire,
wherein the superimposition device superimposes the harmonic component calculated by the harmonic calculation device on the fundamental wave component calculated by the fundamental wave calculation device, and wherein the manipulation device operates the power conversion circuit so as to apply the fundamental wave component, on which the harmonic component is superimposed, to the winding wire.

11. The control apparatus according to claim 1, wherein the superimposition device superimposes each of the harmonic currents having a plurality of orders on the fundamental wave current when a real rotational angular velocity of the rotating machine approaches a resonant angular velocity, and wherein the superimposition device reduces each of the harmonic currents having the plurality of orders or sets each of the harmonic currents having the plurality of orders to be zero, each of the harmonic currents being superimposed on the fundamental wave current, when the real rotational angular velocity of the rotating machine comes away from the resonant angular velocity.

12. The control apparatus according to claim 1, wherein the rotating machine is a concentrated-winding rotating machine.

\* \* \* \* \*